US009347729B2

(12) United States Patent
Hancosky

(10) Patent No.: US 9,347,729 B2
(45) Date of Patent: May 24, 2016

(54) AT THE READY WEAPON HOLDER

(71) Applicant: Jack Hancosky, Avoca, NY (US)

(72) Inventor: Jack Hancosky, Avoca, NY (US)

(73) Assignee: Precision Accuracy Solutions, Inc., Webster, NY (US)

( * ) Notice: Subject to any disclaimer, the term of this patent is extended or adjusted under 35 U.S.C. 154(b) by 0 days.

(21) Appl. No.: 14/877,124

(22) Filed: Oct. 7, 2015

(65) Prior Publication Data

US 2016/0097610 A1  Apr. 7, 2016

Related U.S. Application Data

(60) Provisional application No. 62/060,570, filed on Oct. 7, 2014.

(51) Int. Cl.
*F41A 23/18* (2006.01)
(52) U.S. Cl.
CPC ..................... *F41A 23/18* (2013.01)
(58) Field of Classification Search
CPC ................. F41A 23/26; F41A 23/18
USPC ................. 42/94; 89/37.04; 211/64
See application file for complete search history.

(56) References Cited

U.S. PATENT DOCUMENTS

| 1,166,781 A | 1/1916 | Parrish | |
| 5,503,276 A * | 4/1996 | Pierce | F41A 23/18 211/59.1 |
| 2009/0229160 A1* | 9/2009 | Elliott | F41A 23/04 42/73 |
| 2013/0327799 A1 | 12/2013 | Sitz | |
| 2015/0097094 A1* | 4/2015 | Hartness | A47B 81/005 248/126 |

FOREIGN PATENT DOCUMENTS

| CA | 2272529 | * 11/1999 |
| FR | 2956733 | * 8/2011 |

* cited by examiner

*Primary Examiner* — Stephen M Johnson
(74) *Attorney, Agent, or Firm* — Tracy Jong Law Firm; Tracy P. Jong; Cheng Ning Jong

(57) ABSTRACT

An at the ready weapon holder for supporting a pistol at its barrel, the at the ready weapon holder including a pistol bore support member including a substantially cylindrical rod having a top end and a bottom end and a base including a base plate and a receptacle for receiving the bottom end of the substantially cylindrical rod. The top end of the substantially cylindrical rod is adapted to removably secure the pistol at its barrel by having the top end of the substantially cylindrical rod inserted into the bore of the pistol.

10 Claims, 12 Drawing Sheets

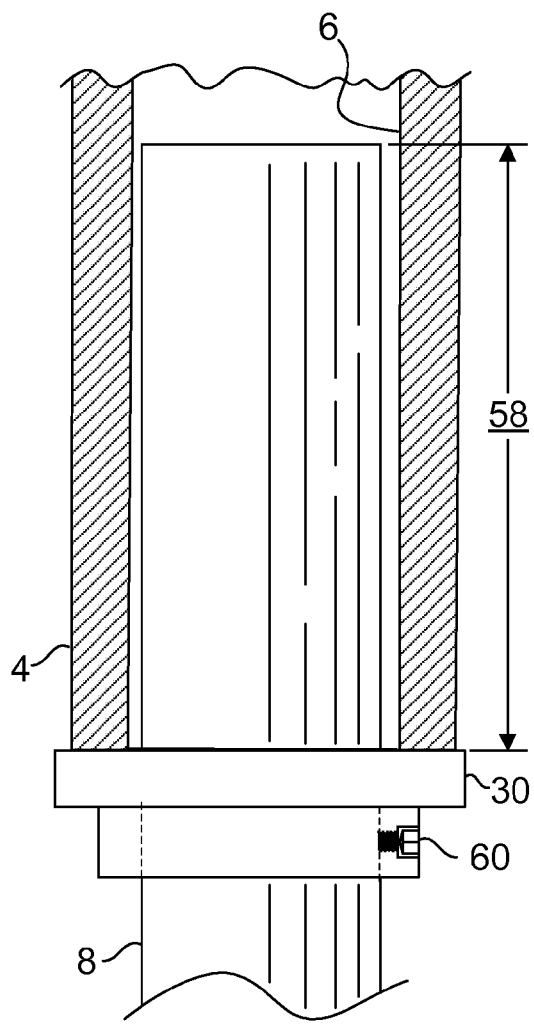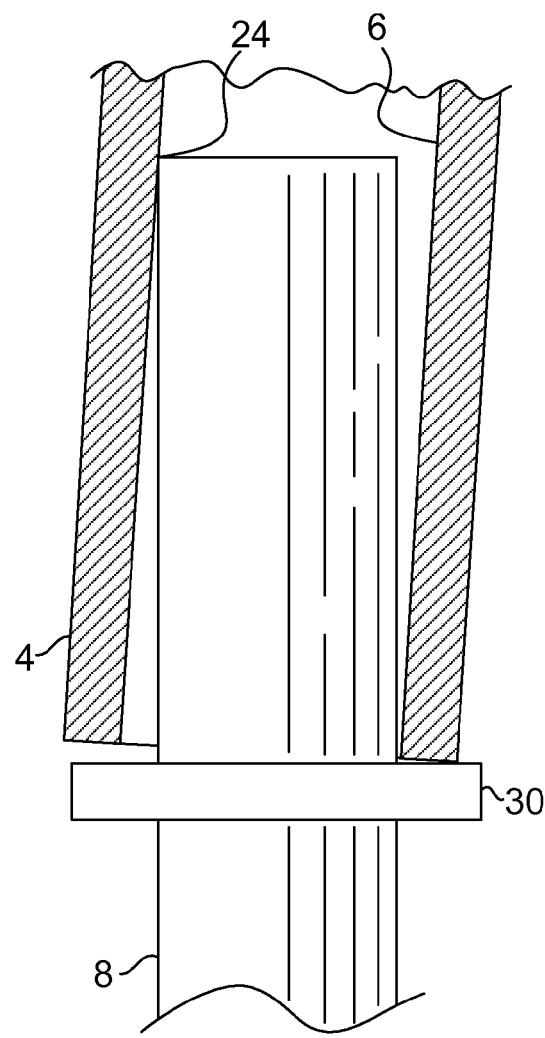

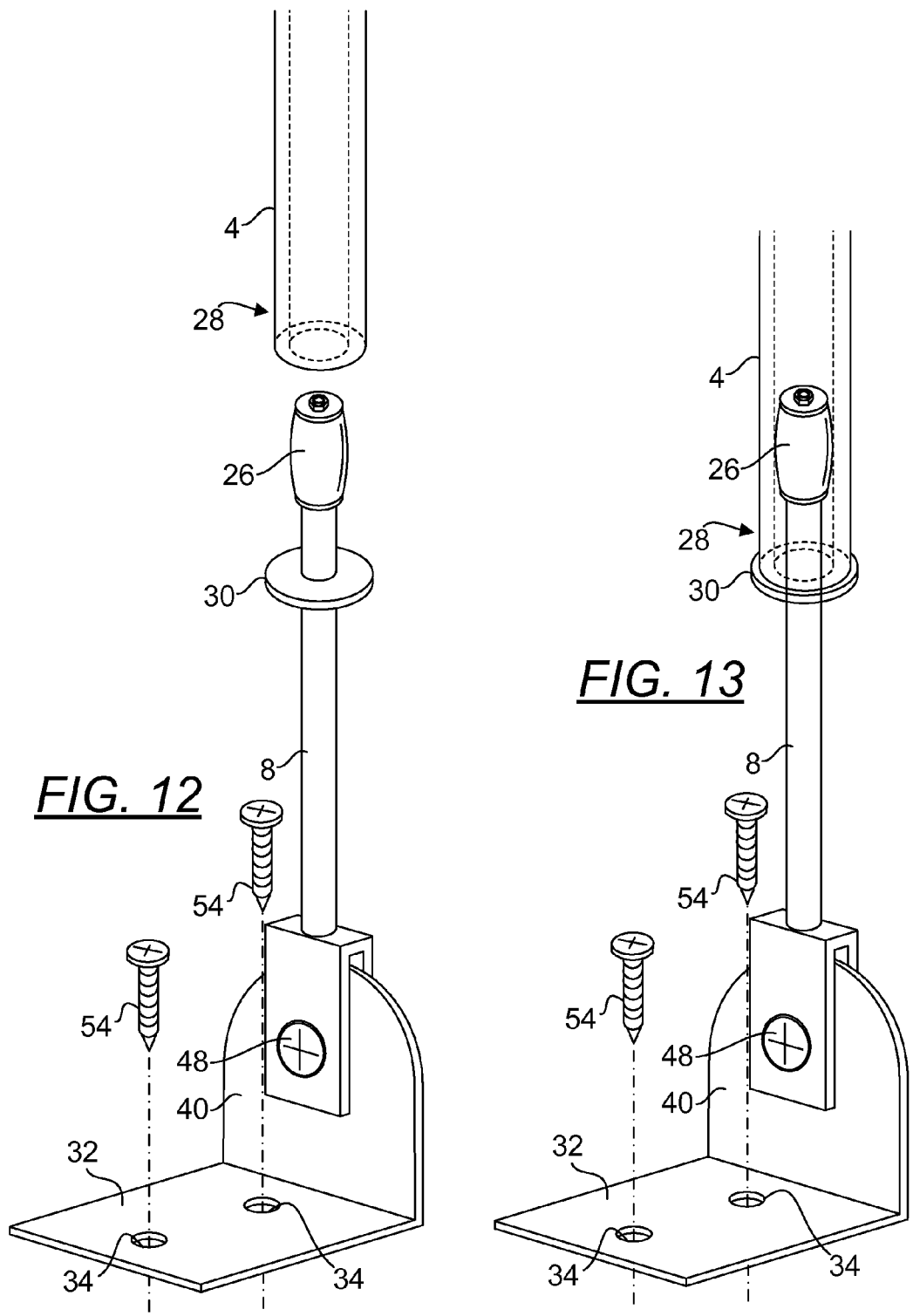

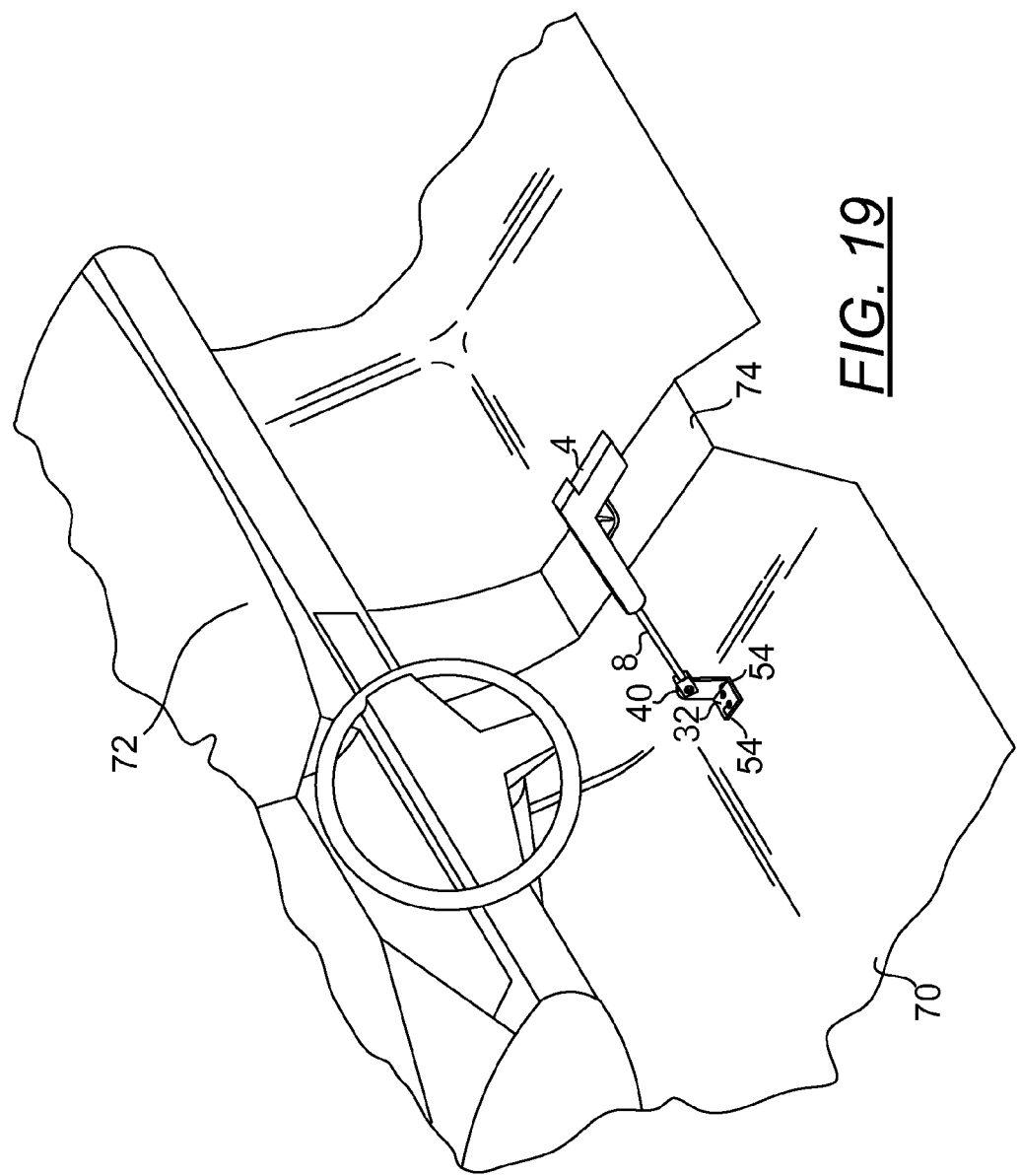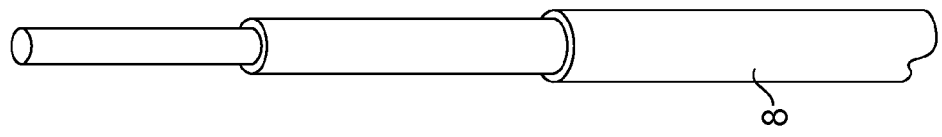

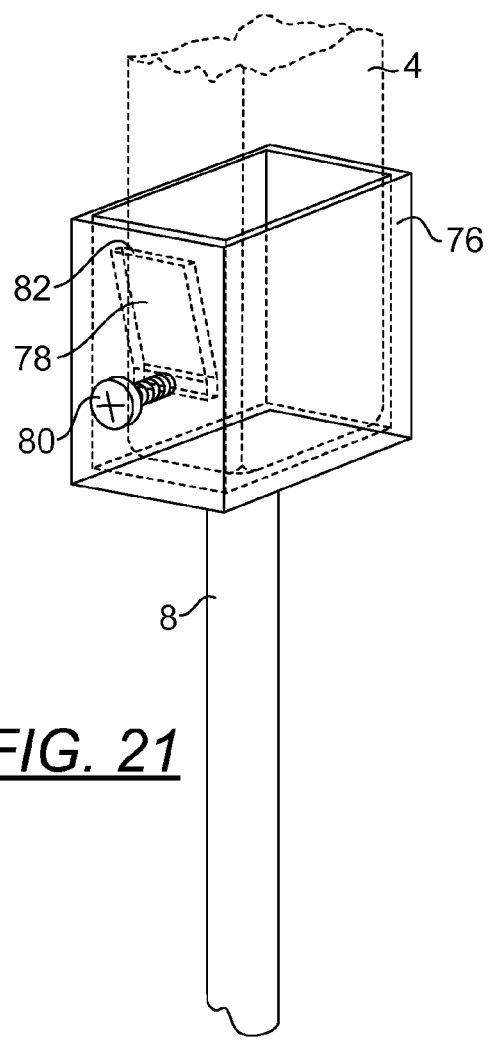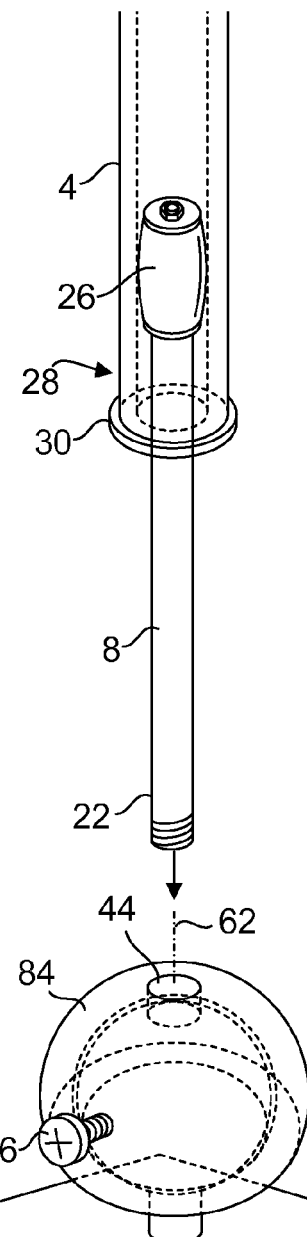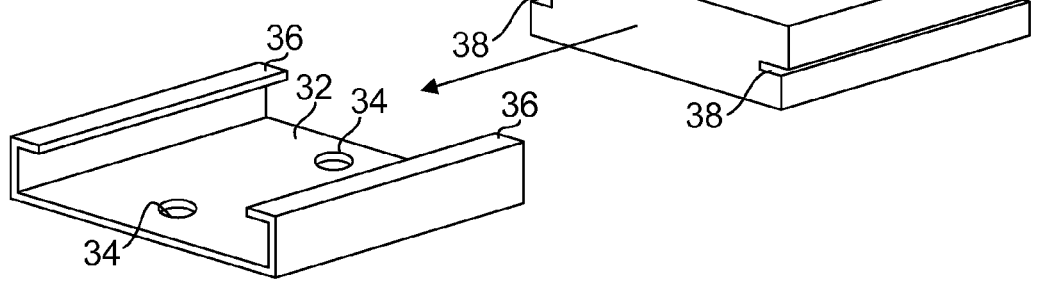
FIG. 21
FIG. 22

AT THE READY WEAPON HOLDER

PRIORITY CLAIM AND RELATED APPLICATIONS

This non-provisional application claims the benefit of priority from provisional application U.S. Ser. No. 62/060,570 filed on Oct. 7, 2014. Said application is incorporated by reference in its entirety.

BACKGROUND OF THE INVENTION

1. The Field of the Invention

The present invention is directed generally to an at the ready weapon holder. More specifically, the present invention is directed to a pistol holder that can be installed on an interior surface of a vehicle and when installed, a pistol secured to the pistol holder is easily accessible, such that a seated pistol can be removed without having a bystander or potential assailant's attention being drawn to this action.

2. Background Art

U.S. Pat. No. 1,166,781 to Parrish (Hereinafter Parrish) discloses a gun holster including a metallic shield having two side pieces for the sides of a gun barrel. The metallic strips are secured at one end to the shield to embrace and support the sides and top of the breech of the gun. Parrish's gun holster further includes a lip secured to the shield to receive and support the trigger guard. The strips and lip constitute the means for connecting the side pieces of the shield in combination with a clasp secured to the shield opposite to the strips and the clasp is adapted to be traversed by a-belt securing the holster to a person. Parrish's gun holster is incapable of being secured to an interior surface of a vehicle, e.g., a vertical wall and a floor, etc. Parrish's metal pin (6 of Parrish) does not serve to support a gun. Instead, Parrish's metal pin serves as a directive agent in placing a gun in a holster, limiting any movement of its muzzle in a lateral direction. Therefore, Parrish's holster requires other parts, e.g., metal strips (2 of Parrish), shield (1 of Parrish), lip (5 of Parrish) to support and secure a gun. All such parts can pose a barrier to quick and inconspicuous motions to remove a gun from its supporting portions and pointing the gun in a desired direction.

U.S. Pat. Pub. No. 2013/0327799 of Sitz (hereinafter Sitz) discloses holders usable to secure a firearm. The holders include a first plate, a second plate extending from the first plate at a first angle, and an insertable member (24 of Sitz) extending from the second plate at a second angle. The insertable member (24 of Sitz) is adapted for insertion into the barrel of the firearm to stabilize the firearm against lateral movement. Friction between the firearm and the first plate, a trigger guard engaged with the holder, or combinations thereof can stabilize the firearm against vertical movement. Such friction can be created using application of a lateral force against the interior of the firearm barrel using the insertable member, application of a lateral force against the exterior of the firearm using a trigger guard, use of a protruding, compressible, or frictional surface on the first plate, or combinations thereof. Sitz's insertable member (24 of Sitz) also serves to stabilize the firearm into which the insertable member is disposed. Additional materials, e.g., a first plate (12 of Sitz), a second plate (14 of Sitz) and a clip (16 of Sitz) still form the main portions for securing a firearm. Sitz's gun holster is also incapable of being secured to an interior surface of a vehicle, e.g., a vertical wall and a floor, etc.

Thus, there is a need for a pistol or weapon holder that can be installed on an interior surface of a vehicle and when installed, a pistol or weapon secured to the holder is easily accessible, such that a seated pistol or weapon can be removed without having attention being drawn to this action or the user remains at the ready to direct and fire the pistol.

SUMMARY OF THE INVENTION

In accordance with the present invention, there is provided a pistol holder for supporting a pistol at its barrel. The pistol holder including a barrel support member including a substantially cylindrical rod having a top end, a bottom end and a base having a base plate and a receptacle for receiving the bottom end of the substantially cylindrical rod. The top end of the substantially cylindrical rod is adapted to removably secure the pistol at its barrel by inserting the substantially cylindrical rod at the top end of the substantially cylindrical rod into the bore of the pistol.

The present support member is configured to support any devices having an elongated bore, such devices including, but not limited to, a handgun, pistol, revolver, shotgun, rifle, etc. When a supplemental holder is coupled with the support member, the present support member can be used to support cylindrically-shaped cans, such as pepper spray canisters, etc.

In one embodiment, the pistol holder further includes a stop protruding from a portion along the length of the substantially cylindrical rod, where the stop is adapted to prevent further insertion of the top end into the pistol bore.

In one embodiment, the base plate further includes at least one aperture for receiving a fastener used to secure the base to an interior surface of a vehicle.

In one embodiment, the base plate further includes an adhesive material adapted to the base plate. The adhesive material is configured to removably attach the base to an interior surface of a vehicle.

In one embodiment, the present holder further includes a resilient knob adapted to resiliently receive the pistol at its pistol bore, where the resilient knob is disposed at the top end of the substantially cylindrical rod.

In one embodiment, the resilient knob is substantially spherical.

In one embodiment, the overall diameter of the resilient knob is adjustable.

In one embodiment, the resilient knob includes a sleeve, a bottom retainer, a top retainer and a fastener, the bottom retainer is disposed at the top end of the substantially cylindrical rod and the top retainer disposed at an opposing end from the bottom retainer away from the top end of the substantially cylindrical rod, the sleeve is disposed between the bottom retainer and the top retainer, the fastener is disposed longitudinally through the top retainer, the sleeve and rotatably secured to the bottom retainer such that the state of longitudinal compression of the sleeve is alterable by turning the fastener.

In one embodiment, the present pistol holder further includes a hinge disposed on the bottom end, where the hinge is attached to the base such that the pistol bore support member is hingedly connected to the base.

In one embodiment, there is further provided a canister holder having a receptacle configured for receiving a cylindrically-shaped apparatus on a first end and a support member adaptor configured to be removably attached to the top end of the of the substantially cylindrical rod on a second end.

In one embodiment, there is further provided a cup having an opening adapted to receive the pistol at its barrel and a bottom portion adapted to be removably secured to the top end of the rod.

In one embodiment, there is further provided a resilient plate having two ends, where the resilient plate is disposed within the opening of the cup and the resilient plate is configured to be attached at one of the two ends of the resilient plate, leaving another one of the two ends of the resilient plate unattached and freely urging against the pistol at its barrel to secure the pistol in place.

In one embodiment, there is further provided an adjustment screw adapted to alter the degree to which the unattached end of the resilient plate protrudes into the opening of the cup.

An object of the present invention is to provide a pistol holder that is capable of securing a pistol in an easy-to-remove position and a position conforming to a user's natural posture and allowing the removal of the pistol secured in this position using only one hand that is also ready to fire the pistol. Essentially, a pistol can be disposed in at the ready position such that it can be readily directed and fired.

An object of the present invention is to provide a pistol holder that is capable of securing a pistol such that it is removable in a manner without drawing an assailant's attention to it.

An object of the present invention is to provide a pistol holder that can be mounted in a tight space in a vehicle.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 5 is a partial side orthogonal view of the embodiment shown in FIG. 2 with the pistol bore seated in one position.

FIG. 6 is a partial side orthogonal view of the embodiment shown in FIG. 2 with the pistol bore seated in another position.

FIG. 12 is a top perspective view of another embodiment of the present mounting base with the pistol bore disposed in an unseated position.

FIG. 13 is a top perspective view of another embodiment of the present mounting base with the pistol bore disposed in a seated position.

FIG. 19 is a partial diagram depicting the use of a present holder in a vehicle.

FIG. 20 depicts another embodiment of the present support member of a pistol holder according to the present invention.

FIG. 21 depicts yet another embodiment of the present support member of a pistol holder according to the present invention.

FIG. 22 depicts yet another embodiment of the present support member of a pistol holder according to the present invention.

PARTS LIST

2—pistol holder
4—pistol
6—bore
8—support member
10—flexible sleeve
12—bottom retainer
14—top retainer
16—fastener
18—screw hole
20—fastener head
22—threaded end
24—contact portion between bore and support member
26—adjustable knob
28—tip of pistol barrel
30—stop
32—base plate
34—aperture
36—guide
38—slit
40—base
42—support member insertion surface 44—receptacle
46—knob
48—pivot
50—angle at which base plate is mounted with respect to support member
52—offset between stop and knob
54—fastener
56—pepper spray canister
58—insertion depth
60—set screw
62—central axis of receptacle
64—canister holder adaptor
66—receptacle
68—adhesive material
70—driver side foot well of vehicle
72—dashboard
74—center console
76—cup
78—resilient plate
80—adjustment screw
82—one end of resilient plate
84—ball joint
86—lock screw

PARTICULAR ADVANTAGES OF THE INVENTION

The present pistol holder securely supports a pistol in a position ready to be removed at moment's notice with one hand holding the pistol and with minimal action. The present pistol is simple in construction and intuitive to use. The present pistol may be mounted to a variety of surfaces orientated at various angles with respect to the horizontal plane.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1:
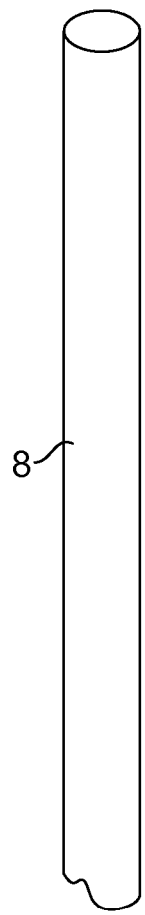
FIG. 1 depicts one embodiment of the present support member of a pistol holder according to the present invention.

FIG. 1 depicts one embodiment of the present support member of a pistol holder according to the present invention. As shown, the support member 8 is a substantially cylindrical rod or tube having an outer diameter configured sufficiently small such that it may be inserted into the bore of a pistol but sufficiently large such that the pistol is adequately secured in place. In instances where the support member is disposed at an incline, the support member may not need to be fully inserted, i.e., the tip of the support member may come in contact with a portion 24 along the length of the pistol's bore 6. In other instances, the weight of the pistol disposed over the support member may also cause the tip of the support member to contact a portion 24 along the length of the pistol's bore 6. The present pistol holder therefore supports the pistol by its pistol bore.

The present support member has a top end and a bottom end. The top end of the support member is adapted to removably secure the pistol at its pistol bore. As disclosed elsewhere herein, the present holder further includes a base having a base plate and a receptacle for receiving the bottom end of the support member.

Figure 2:
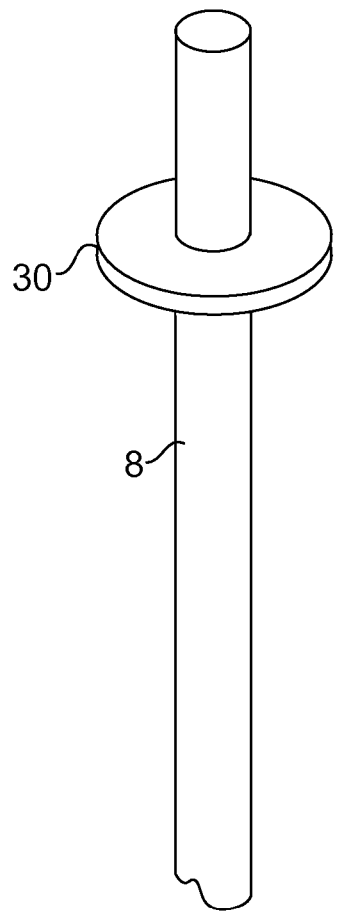
FIG. 2 depicts another embodiment of the present support member of a pistol holder according to the present invention.

FIG. 2 depicts another embodiment of the present support member of a pistol holder according to the present invention. In this embodiment, the present support member further includes a stop 30 protruding from a portion along the length of the substantially cylindrical rod, where the stop is adapted to prevent further insertion of the top end of the support member into the pistol bore. As shown in ensuing drawings, the stop 30 is used to prevent further insertion of a gun barrel over the present support member 8 such that the pistol bore is not excessively or deeply engaged with the support member 8 within its bore.

Figure 3:
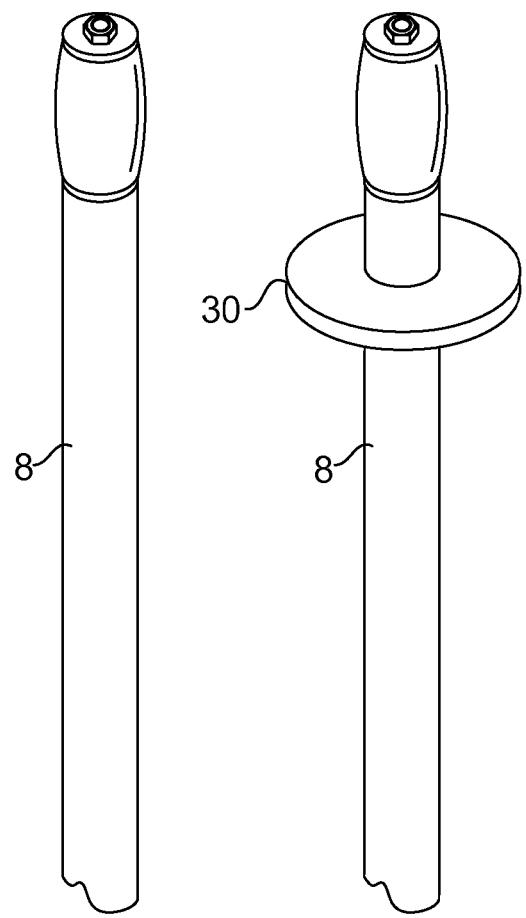
FIG. 3 depicts yet another embodiment of the present support member of a pistol holder according to the present invention.
Figure 4:
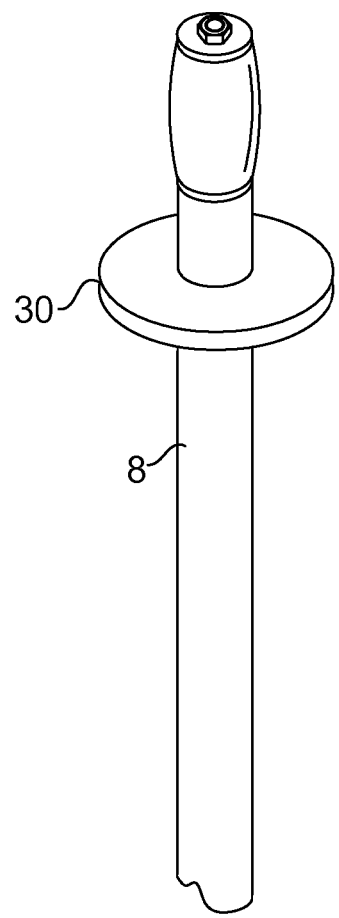
FIG. 4 depicts yet another embodiment of the present support member of a pistol holder according to the present invention.

FIG. 3 depicts yet another embodiment of the present support member of a pistol holder according to the present invention. In this embodiment, there is provided an adjustable knob. It shall be noted that no stop is used as the adjustable knob is capable of supporting a pistol barrel at its bore by friction and preventing the support member reaching too far in the bore. FIG. 4 depicts yet another embodiment of the present support member of a pistol holder according to the present invention, depicting an embodiment where a stop is still desired when used in conjunction with an adjustable knob. If increased securement of the pistol bore is required, e.g., due to the weight of a pistol, a stop 30 is added as shown in FIG. 4 not only to prevent excessive insertion of the support member 8 in a pistol bore but also to provide a surface disposed perpendicularly to the axial axis of the support member 8 to cause the support member to align substantially in parallel with the pistol bore 6.

FIG. 5 is a partial side orthogonal view of the embodiment shown in FIG. 2 with a pistol bore seated in one position. FIG. 6 is a partial side orthogonal view of the embodiment shown in FIG. 2 with a pistol bore seated in another position.

In order to enable easy insertion of the support member 8 in the bore of a pistol, sufficient clearance is required between the support member 8 and the bore. In one embodiment, the insertion depth 58 ranges from about 1 cm to about 5 cm. In some orientations, when seated as in FIG. 5, the pistol is supported with its bore disposed substantially in parallel with the support member 8. In other orientations, when seated, the pistol is supported with its bore disposed substantially at an angle to the support member 8 as shown in FIG. 6. In the former orientation, binding may still occur when the pistol is hastily pulled from the support member. In the latter, contact between the bore 6 and support member 8 forms a contact portion 24. The support member 8 is therefore preferably made of a material having a hardness that is less than that of the material hardness of the pistol bore or a material compatible with such bore. In the embodiment shown in FIG. 5, the stop 30 is configured to be adjustable along the length of the support member 8. A set screw 60 is provided to secure the stop 30 to the support member 8. Upon unscrewing the set screw 60, the stop 30 is then free to slide along the support member 8 until a suitable position is selected, at which time the set screw 60 is tightened. In order to reduce or eliminate potential binding, the support member 8 is preferably constructed with smooth surfaces with minimal friction-causing surface qualities. Suitable surface materials include, but not limited to, polytetrafluoroethylene and nylon. In another embodiment, the tip of the support member 8 may be rounded to reduce the potential for binding or developing stress concentration areas.

Figure 8:
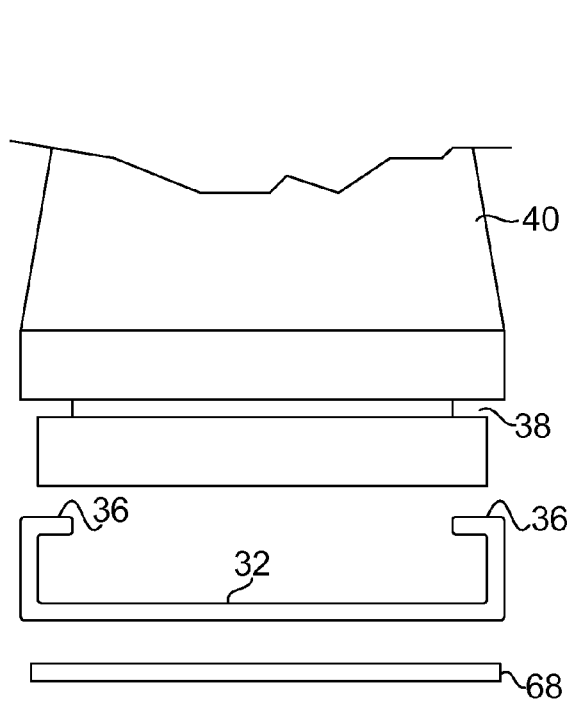
FIG. 8 is a partial view of the embodiment of the present pistol holder of FIG. 7, depicting the means by which a base plate is secured to the slit.
Figure 7:
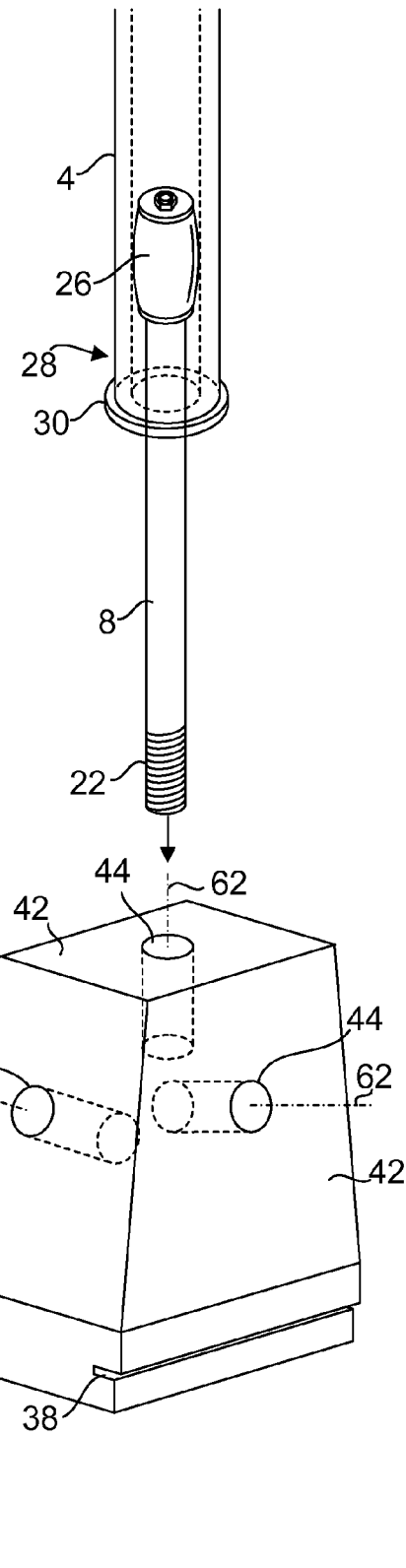
FIG. 7 is a top perspective view depicting one embodiment of the present pistol holder adapted to receive a pistol.

FIG. 7 is a top perspective view depicting one embodiment of the present pistol holder adapted to receive a pistol. A base 40 is provided to support a support member 8. FIG. 8 is a partial view of the embodiment of the present pistol holder of FIG. 7, depicting the means by which a base plate 32 is secured to the slit 38. In this embodiment, the base 40 comprises a plurality of receptacles 44 for receiving the bottom end of a support member 8. The receptacles 44 are essentially apertures, each having a central axis 62 and configured sufficiently deep to securely receive the bottom end of the support member 8. In one embodiment, the bottom end is threaded to form a threaded end 22. Each securing aperture 44 is matingly threaded such that the support member can be screwed into and fastened to the base 40. The central axes 62 of the receptacles 44 are preferably disposed such that the support member 8 can be mounted in a wide variety of orientations. Multiple support members 8 may also be secured to multiple receptacles 44 such that one or more users can quickly retrieve one or more pistols from their respective pistol holders, without struggling with their respective support members 8. A base plate 32 is further provided to increase the number of orientations to mount the base 40 to an interior part of a vehicle, e.g., dashboard, center console, foot well, etc. The base 40 can be coupled with the base plate 32 in one of two orientations. Further, if one fastener is used to secure the base plate 32, the base plate 32 can be further adjusted even after installation is complete. The base plate 32 is essentially a plate having at least one aperture 34 for receiving a fastener used to secure the base plate 32 to an interior surface of a vehicle and two guides 36 substantially disposed in a parallel configuration, the guides 36 are configured to be slidingly received at the slits 38 such that the base 40 can be secured to the base plate 32. In one embodiment, base 40 is secured by friction to the base plate 32. In another embodiment, base 40 is alternatively or additionally secured to the base plate 32 with a screw or another fastener that is passed through an aperture on the base plate 32. The base 40 and base plate 32 may be collectively called a base. A structure through which the holder is either fixedly or removably secured to a vehicle may be called a base plate. In one embodiment, the base plate further alternatively or additionally includes an adhesive material 68 adapted to the base plate. The adhesive material 68 is configured to removably attach the base to an interior surface of a vehicle.

Figure 9:
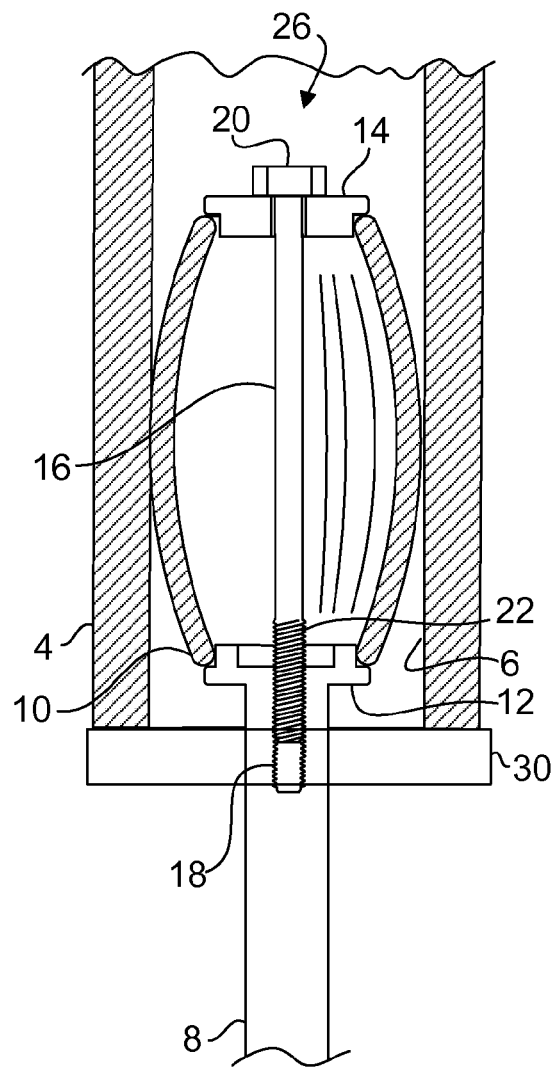
FIG. 9 is a partial orthogonal sectional view of one embodiment of the adjustable knob of the present pistol holder, depicting the adjustable knob suitable for a pistol bore of one size.
Figure 10:
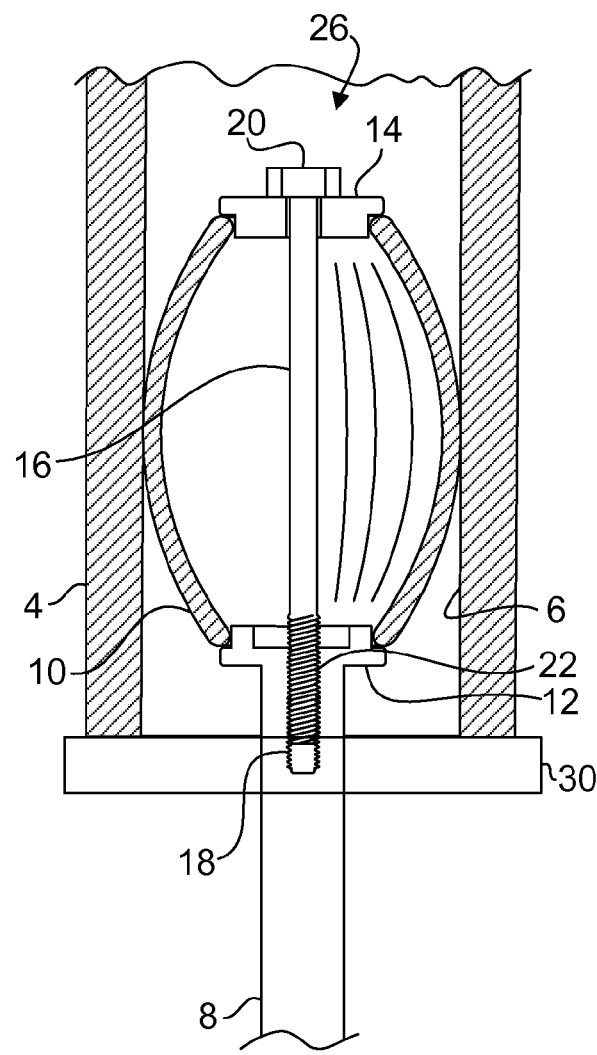
FIG. 10 is a partial orthogonal sectional view of one embodiment of the adjustable knob of the present pistol holder, depicting the adjustable knob suitable for a pistol bore of another size.
Figure 11:
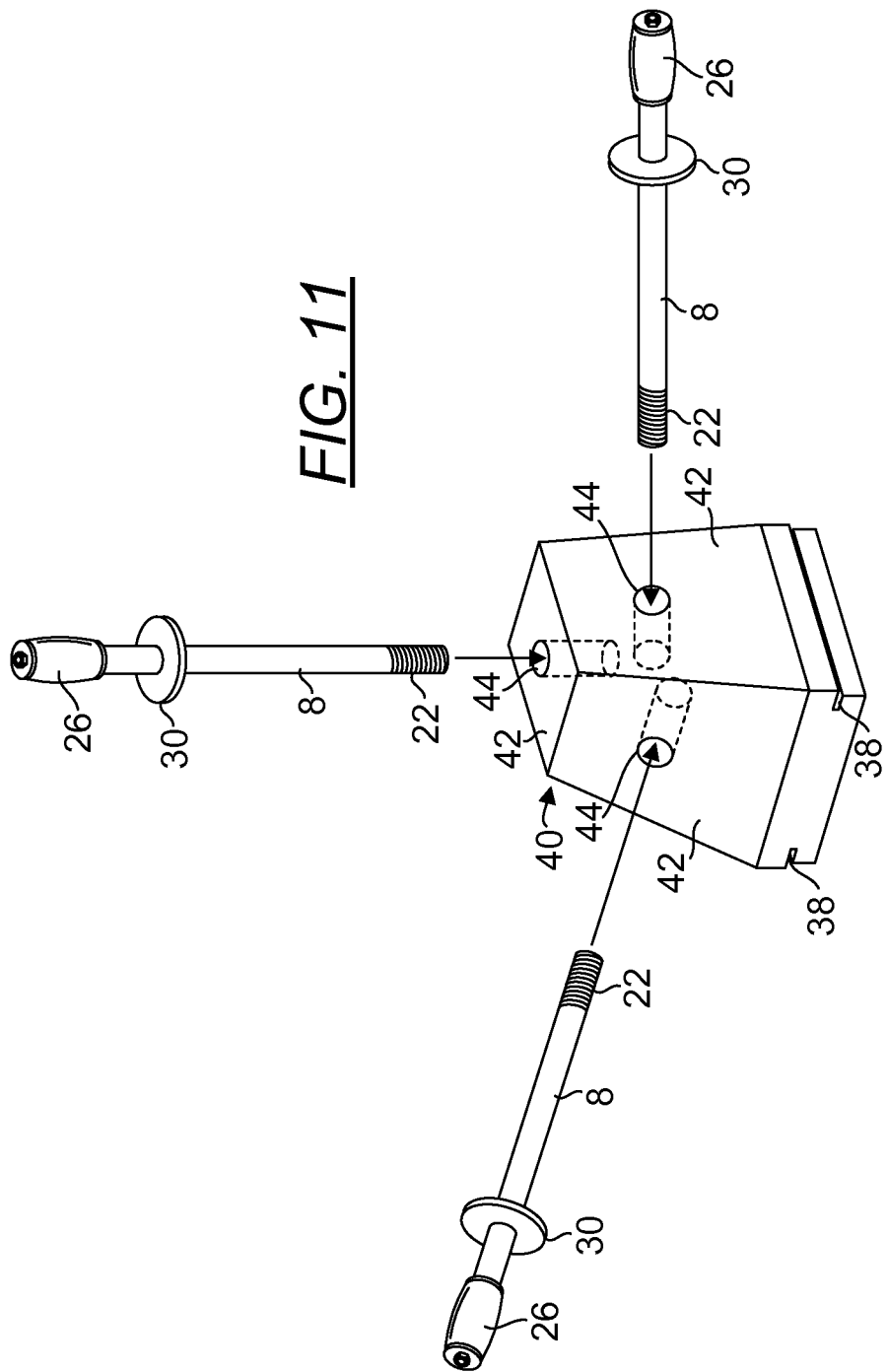
FIG. 11 is a top perspective view of one embodiment of the present mounting base, depicting the possibility of disposing the support member in several orientations, thereby allowing the block supporting the support member to be mounted in more than one way.

FIG. 9 is a partial orthogonal sectional view of one embodiment of the adjustable knob 26 of the present pistol holder, depicting the adjustable knob 26 suitable for a pistol bore of one size. FIG. 10 is a partial orthogonal sectional view of one embodiment of the adjustable knob 26 of the present pistol holder, depicting the adjustable knob 26 suitable for a pistol bore of another size. FIG. 11 is a top perspective view of one embodiment of the present mounting base, depicting the possibility of disposing the support member in several orientations, thereby allowing the block supporting the support member 8 to be mounted in more than one way.

The adjustable knob is essentially a resilient knob including a sleeve 10, a bottom retainer 12, a top retainer 14 and a fastener 16, the bottom retainer 12 is disposed at a first end and removably or fixedly attached to the top end. The top retainer 14 is disposed at an opposing end from the bottom retainer 12 at the first end, away from the support member 8. The sleeve 10 is disposed between the bottom retainer 12 and the top retainer 14 and the fastener 16 is disposed through the top retainer 14, the sleeve 10 and rotatably secured to the bottom retainer 12 at screw hole 18 such that the state of longitudinal compression of the sleeve 10 is alterable by turning the fastener 16. For instance, tightening of fastener 16 via the head 20 causes the distance between the top retainer 14 and the bottom retainer 12 to shrink, causing the sleeve 10 to be further compressed as shown in FIG. 10 and increasing the overall diameter of the sleeve 10. When fastener 16 is being loosened with respect to the bottom retainer 12, the distance between the top retainer 14 and the bottom retainer 12 increases, causing the sleeve 10 to be further relaxed as shown in FIG. 10 and increase in overall diameter. In either case, any small area contact between a support member 8 and a pistol bore as shown in FIG. 6 can be eliminated, reducing the possibility of binding during removal of a pistol from the support member 8. As the diameter of the sleeve 10 is adjustable, the adjustable knob 26 can be adjusted in size to properly secure pistol bores of various sizes.

Figure 14:
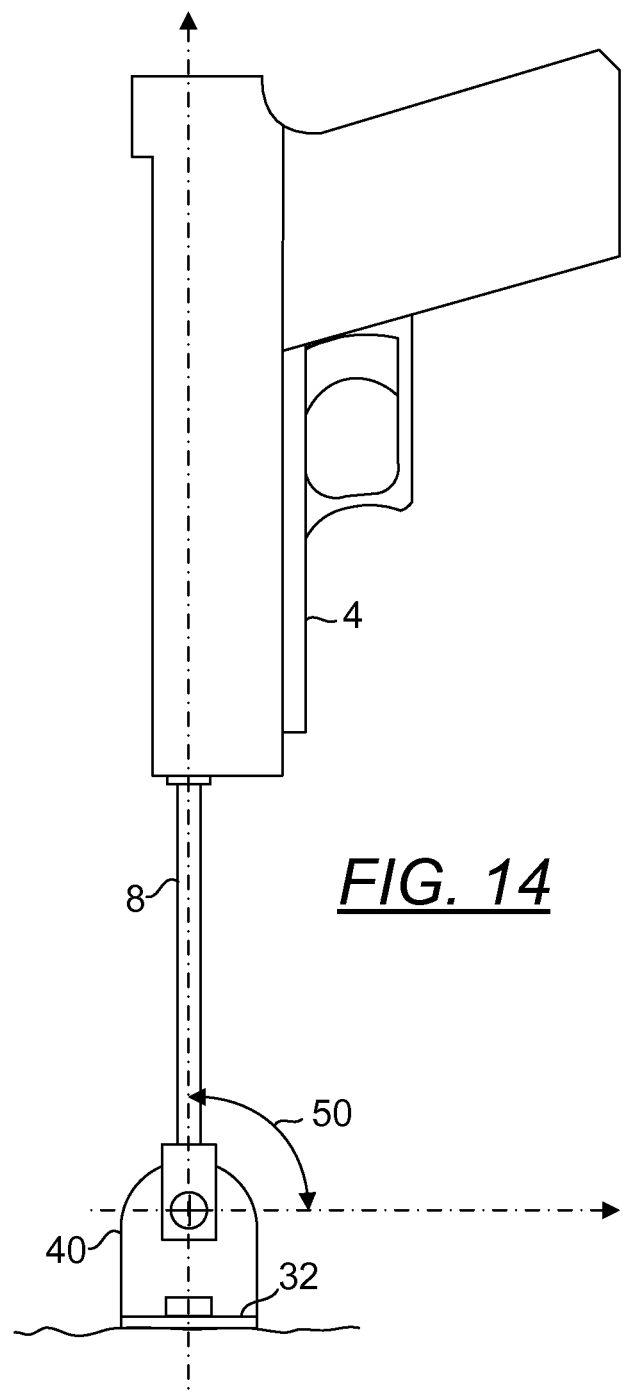
FIG. 14 is a side orthogonal view of one embodiment of the present support member, depicting its use for holding a pistol at a substantially vertical configuration.
Figure 15:
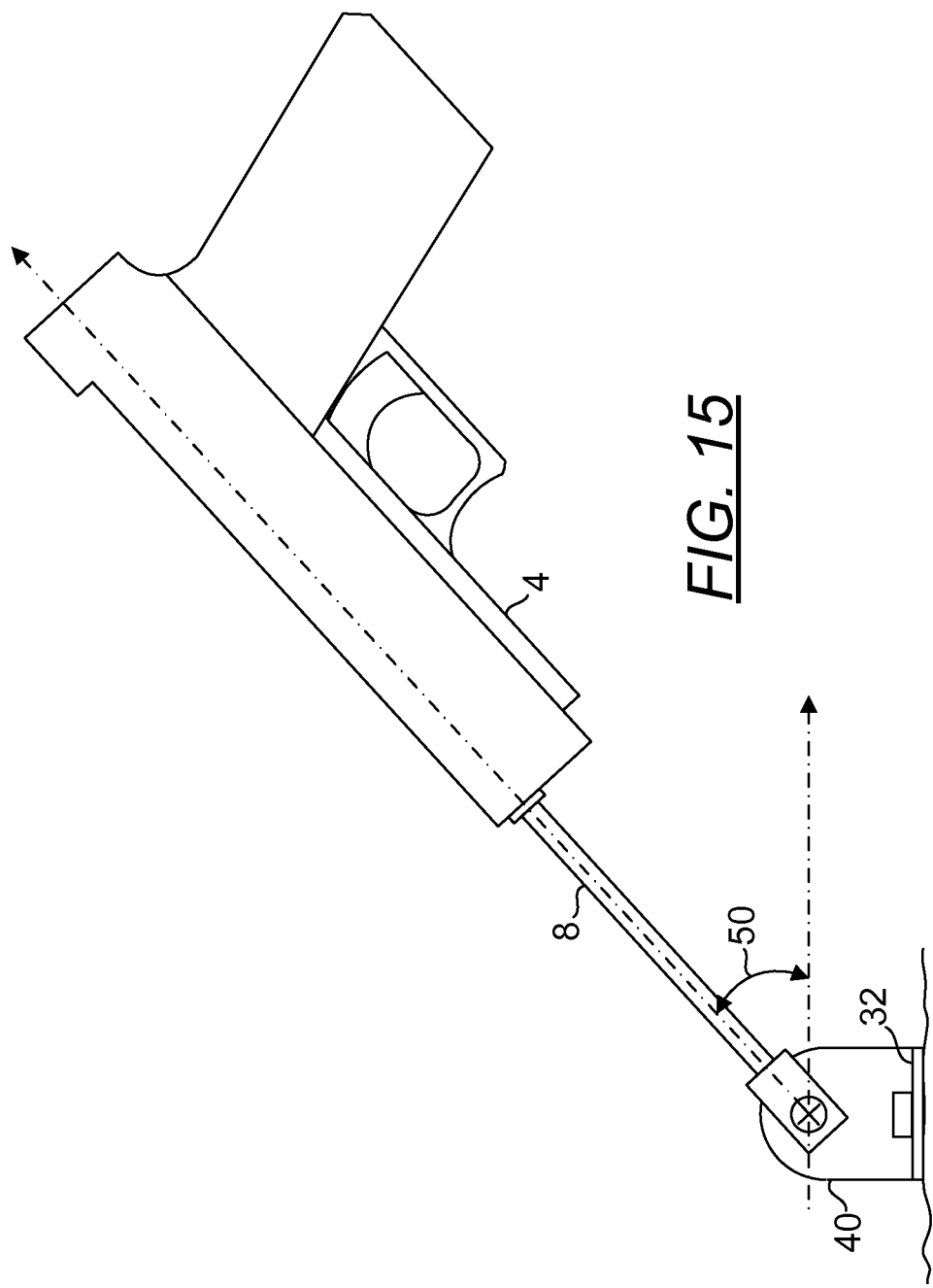
FIG. 15 is a side orthogonal view of one embodiment of the present support member, depicting its use for holding a pistol at a substantially 45-degree configuration.

FIG. 12 is a top perspective view of another embodiment of the present mounting base with the pistol bore disposed in an unseated position. FIG. 13 is a top perspective view of another embodiment of the present mounting base with the pistol bore disposed in a seated position. In this embodiment, the base 40 is essentially an L-shaped bracket including a base plate 32 having apertures 34 for receiving fasteners and a receptacle for pivotably supporting a support member 8 at pivot 48. In this embodiment, the receptacle is essentially a rectangular plate having two rounded corners enabling rotation of the support member 8 of from about 0 to 180 degrees about a rotational axis through pivot 48. Upon securing the base plate 32 on a mounting surface, the orientation of the support member 8 about pivot 48 can then be adjusted and the pivot 48 tightened or locked to fix the support member 8 orientation in place as shown in FIGS. 14 and 15. FIG. 14 is a side orthogonal view of one embodiment of the present support member, depicting its use for holding a pistol at a substantially vertical configuration. FIG. 15 is a side orthogonal view of one embodiment of the present support member, depicting its use for holding a pistol at a substantially 45-degree configuration.

Figure 16:
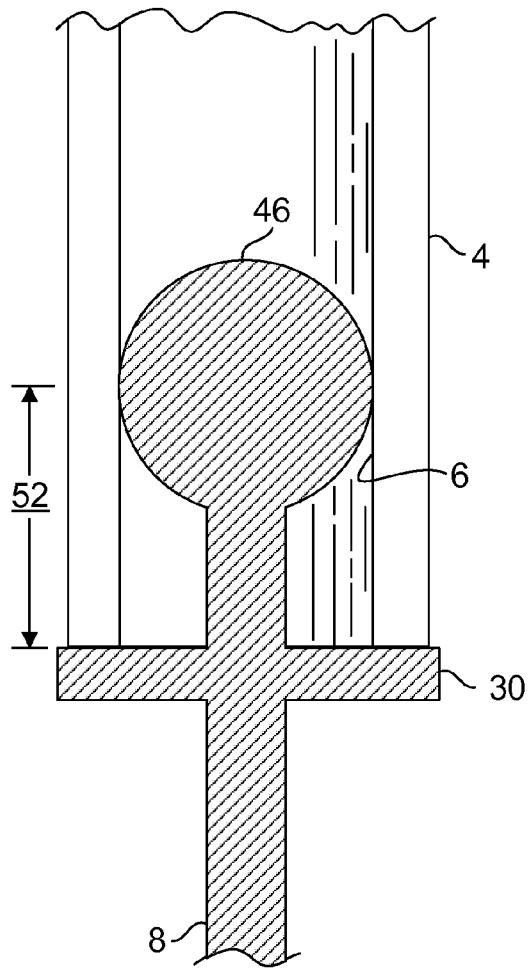
FIG. 16 is a partial side orthogonal sectional view of one embodiment of the present support member, depicting a fixed knob disposed at the tip of the support member.
Figure 17:
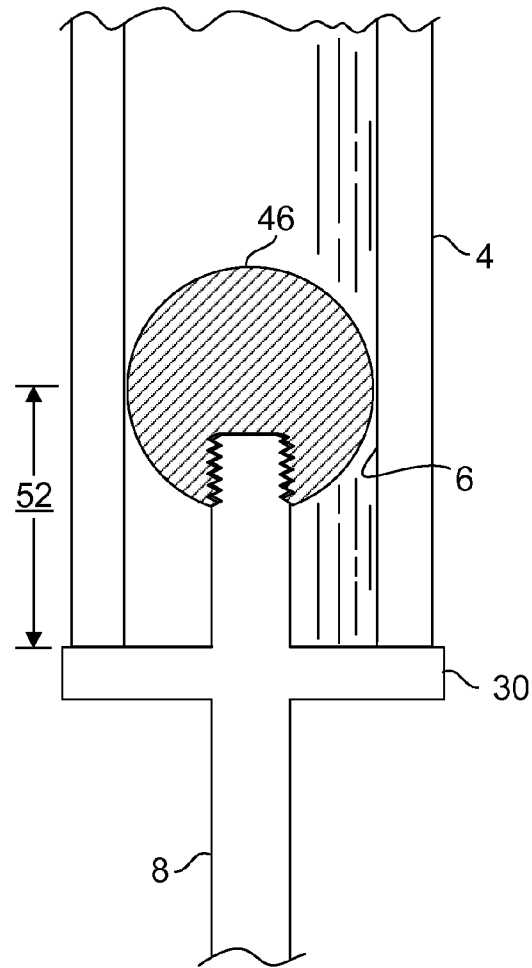
FIG. 17 is a partial side orthogonal sectional view of one embodiment of the present support member, depicting a replaceable knob disposed at the tip of the support member.

FIG. 16 is a partial side orthogonal sectional view of one embodiment of the present support member, depicting a fixed knob 46 disposed at the tip of the support member 8. The knob 46 provides sufficient support and securement to the pistol while allowing it to be removed without causing binding of the pistol bore with the support member 8 and any harm due to one or more small contact portions, i.e., stress concentration areas. FIG. 17 is a partial side orthogonal sectional view of one embodiment of the present support member 8, depicting a replaceable knob 46 disposed at the tip of the support member 8. Such configuration allows knobs of different sizes or diameters be utilized according to the bore sizes of pistols and makes the contact material with the bore of pistols interchangeable. In one embodiment, the offset 52 between a stop 30 and a knob 46 ranges from about 1 cm to about 5 cm.

In all embodiments, the insertion of a support member in the bore also prevents intrusions of insects, e.g., ants, spiders, which may nest inside the bore a pistol if the bore is left unplugged, risking proper operations of the pistol due to blockage in the bore.

Figure 18:
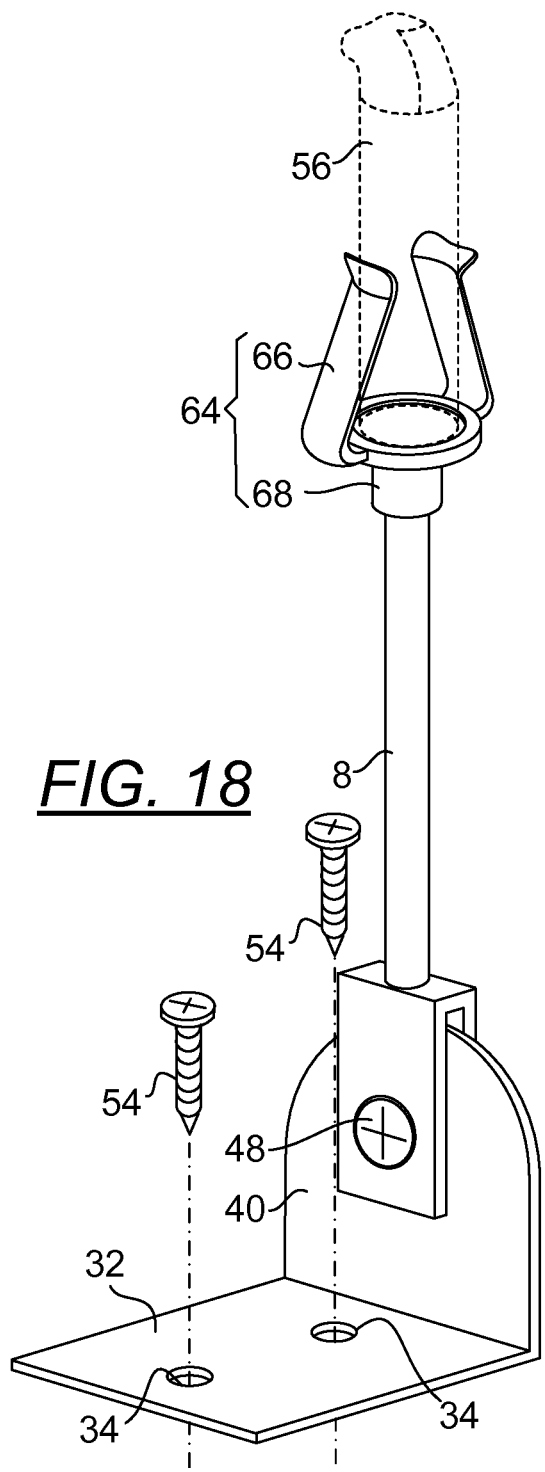
FIG. 18 is a top perspective view of one embodiment of the present holder adapted for use to hold a pepper spray canister.

FIG. 18 is a top perspective view of one embodiment of the present holder adapted for use to hold a pepper spray canister 56. A canister holder 64 is adapted to the tip of a support member 8 to provide a receptacle 66 to receive and secure a canister in place. A canister secured in the receptacle 66 can be easily removed when a grasp and a pull are applied to the canister in a direction away from the canister holder 64. The canister holder 64 may be removably or permanently secured to the tip of the support member 8 using any one of a number of well-known securing means, such as, welding, adhesive, etc., at the canister holder 64 adaptor. In another embodiment, a canister holder may be integrally formed with a support member 8. The canister holder 64 may also be removably secured to the support member 8 using any one of a number of removable fastening components, such as, screws 54, spring loaded locks, etc., at the canister holder 64 adaptor.

FIG. 19 is a partial diagram depicting the use of a present holder 2 in a vehicle with seats of the vehicle removed to reveal more clearly the driver and front passenger side foot well areas. The pistol holder 2 is shown secured to the driver side foot well 70 area. As shown, the pistol holder 2 is disposed on the right side of the driver side foot well 70 area as a right-handed driver will be capable of quickly retrieving the pistol 4 in time of need and pointing the weapon in a desired direction without unnecessarily drawing attention to such action. The pistol holder 2 may alternatively mounted in any location convenient to the user.

FIG. 20 depicts another embodiment of the present support member of a pistol holder according to the present invention. In this embodiment, the support member 8 is a telescopic structure, enabling length adjustment of the support member 8. In one embodiment, the support member 8 is a telescopic structure having segments that are lockable, i.e., the support member 8 may be brought to its desired length and the segments can be subsequently locked to prevent further changes in length until when the support member 8 length is again adjusted.

FIG. 21 depicts yet another embodiment of the present support member 8 of a pistol holder according to the present invention. In this embodiment, there is further provided a cup 76 having an opening adapted to receive the pistol 4 at its barrel and a bottom portion adapted to be removably secured to the top end of the rod. In one embodiment, there is further provided a resilient plate 78 having two ends, where the resilient plate 78 is disposed within the opening of the cup 76 and the resilient plate 78 is configured to be attached at one end 82 of the two ends of the resilient plate 78, leaving another one of the two ends of the resilient plate 78 unattached and freely urging against the pistol at its barrel to secure the pistol in place when the pistol is disposed with its barrel seated in the cup 76. In one embodiment, there is further provided an adjustment screw 80 adapted to alter the degree to which the unattached end of the resilient plate 78 protrudes into the opening of the cup to secure the barrel of the seated pistol. Additional resilient plates or materials may be disposed on other surfaces of the cup 76 to allow adjustments of the space within the cup 76 from other directions in order to receive the barrel of a pistol snuggly. The cup 76 may also be removably secured to the support member 8 using any one of a number of removable fastening components, such as, screws, spring loaded locks, etc., at the bottom of the cup 76.

FIG. 22 depicts yet another embodiment of the present support member of a pistol holder according to the present invention. Instead of the insertion surfaces 42 shown in FIG. 7, the base 40 includes a ball joint 84 into which the bottom end of the support member 8 is inserted. The ball joint 84 enables the support member 8 to be disposed in various orientations. Additionally and as shown, a lock screw 86 may be provided to allow locking of the ball of the ball joint to prevent drifting of the support member 8 position and orientation.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. An at the ready weapon holder for supporting a pistol at a barrel of the pistol, the pistol having a bore disposed at the barrel, said at the ready weapon holder comprising:
   (a) a pistol bore support member comprising a rod having a top end and a bottom end, said top end is adapted to removably secure the pistol at the barrel of the pistol by inserting said rod at said top end into the bore of the pistol;
   (b) a base adapted to receive said bottom end; and
   (c) a resilient knob adapted to resiliently receive the pistol at the bore of the pistol, wherein said resilient knob is disposed at said top end of said rod and the overall diameter of said resilient knob is adjustable, said resilient knob comprises a sleeve, a bottom retainer, a top retainer and a fastener, said bottom retainer is attached to said top end of said rod and said top retainer is disposed at an opposing end from said bottom retainer away from said top end of said rod, said sleeve is disposed between said bottom retainer and said top retainer, said fastener is disposed longitudinally through said top retainer, said sleeve is urged against said bottom retainer such that a state of longitudinal compression of said sleeve is alterable by turning said fastener.

2. The at the ready weapon holder of claim 1, said base comprising a base plate and a receptacle for receiving said bottom end of said rod.

3. The at the ready weapon holder of claim 1, wherein said rod further comprises a length and said at the ready weapon holder further comprises a stop protruding from a portion along the length of said rod and said stop is adapted to prevent further insertion of said top end of said rod into the bore of the pistol.

4. The at the ready weapon holder of claim 3, wherein said stop is adapted to slide along and removably securable to said rod such that the position of said stop along said rod is adjustable.

5. The at the ready weapon holder of claim 1, wherein said base plate further comprises at least one aperture for receiving a fastener used to secure said base to an interior surface of a vehicle.

6. The at the ready weapon holder of claim 1, wherein said base plate further comprises an adhesive material adapted to said base plate, said adhesive material is configured to removably attach said base to an interior surface of a vehicle.

7. The at the ready weapon holder of claim 1, further comprising a hinge disposed on said bottom end of said rod, wherein said hinge is attached to said base such that said support member is hingedly connected to said base.

8. The at the ready weapon holder of claim 1, said rod comprises a telescopic structure wherein the length of said rod is adjustable.

9. The at the ready weapon holder of claim 1, wherein said rod is substantially cylindrical.

10. The at the ready weapon holder of claim 1, wherein said base comprises a ball joint adapted to permit said support member to be disposed in more than one orientation.

* * * * *